(12) United States Patent
Wei

(10) Patent No.: US 12,452,746 B2
(45) Date of Patent: Oct. 21, 2025

(54) CELL RESELECTION EVALUATION FREQUENCY DETERMINATION METHOD AND APPARATUS, ELECTRONIC DEVICE, AND COMPUTER READABLE STORAGE MEDIUM

(71) Applicant: SANECHIPS TECHNOLOGY CO., LTD., Shenzhen (CN)

(72) Inventor: Yuzhen Wei, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 389 days.

(21) Appl. No.: 18/006,605

(22) PCT Filed: Jul. 23, 2021

(86) PCT No.: PCT/CN2021/108131
§ 371 (c)(1),
(2) Date: Jan. 24, 2023

(87) PCT Pub. No.: WO2022/022416
PCT Pub. Date: Feb. 3, 2022

(65) Prior Publication Data
US 2023/0276318 A1 Aug. 31, 2023

(30) Foreign Application Priority Data
Jul. 28, 2020 (CN) .......................... 202010740297.0

(51) Int. Cl.
*H04W 72/56* (2023.01)
*H04W 36/00* (2009.01)
*H04W 72/0453* (2023.01)

(52) U.S. Cl.
CPC ... *H04W 36/0072* (2013.01); *H04W 72/0453* (2013.01); *H04W 72/56* (2023.01)

(58) Field of Classification Search
None
See application file for complete search history.

(56) References Cited

U.S. PATENT DOCUMENTS

| 9,398,501 | B1 * | 7/2016 | Liu | .................. H04W 36/0085 |
| 2015/0319627 | A1 * | 11/2015 | Jung | ..................... H04W 48/16 370/328 |

(Continued)

FOREIGN PATENT DOCUMENTS

| CN | 103458462 A | 12/2013 |
| CN | 103582049 A | 2/2014 |

(Continued)

OTHER PUBLICATIONS

International Search Report in Application No. PCT/US2021/108131, dated Oct. 14, 202, 4 pages, including English translation.

*Primary Examiner* — The Hy Nguyen
(74) *Attorney, Agent, or Firm* — Dority & Manning, P.A.

(57) ABSTRACT

Provided are a cell reselection evaluation frequency determination method and apparatus, an electronic device, and a computer-readable storage medium, relating to the field of communication technology. The cell reselection evaluation frequency determination method includes receiving priority attribute information and determining the duration of the priority attribute information, where the priority attribute information includes dedicated priority information and/or priority reduction information; determining a cell reselection evaluation frequency set according to the priority attribute information in the duration; and updating the cell reselection evaluation frequency set in response to determining the duration corresponding to the priority attribute information is reached.

20 Claims, 3 Drawing Sheets

(56) References Cited

U.S. PATENT DOCUMENTS

2021/0289404 A1* 9/2021 Tseng .................... H04W 48/18
2023/0072951 A1* 3/2023 Zhang ............... H04W 72/0453

FOREIGN PATENT DOCUMENTS

| CN | 104025655 A | 9/2014 |
| CN | 104756556 A | 7/2015 |
| CN | 107258103 A | 10/2017 |
| CN | 107615819 A | 1/2018 |

* cited by examiner

CELL RESELECTION EVALUATION FREQUENCY DETERMINATION METHOD AND APPARATUS, ELECTRONIC DEVICE, AND COMPUTER READABLE STORAGE MEDIUM

CROSS REFERENCE TO RELATED APPLICATIONS

This is a National Stage Application filed under 35 U.S.C. 371, based on International Patent Application No. PCT/CN2021/108131, filed on Jul. 23, 2021, which claims priority to Chinese Patent Application No. 202010740297.0 filed with the China National Intellectual Property Administration (CNIPA) on Jul. 28, 2020, the disclosures of which are incorporated herein by reference in their entireties.

TECHNICAL FIELD

The present application relates to the field of communication technology.

BACKGROUND

According to the 3rd Generation Partnership Project (3GPP) specification of the radio resource control (RRC) protocol, when user equipment (UE) receives priority reduction information, the UE starts or restarts timing device T325 to record a carrier or an NR (New radio) standard whose priority is reduced, and the UE stores the priority reduction information. In the related art, during cell reselection evaluation, as long as a frequency exists in system information and has a corresponding priority, measurement is started, and the frequency is involved in the cell reselection evaluation.

SUMMARY

In one aspect of an embodiment of the present application, a cell reselection evaluation frequency determination method is provided. The method includes receiving priority attribute information and determining the duration of the priority attribute information, where the priority attribute information includes dedicated priority information and/or priority reduction information; determining a cell reselection evaluation frequency set according to the priority attribute information; and updating the cell reselection evaluation frequency set when it is determined that the duration corresponding to the priority attribute information is reached.

In another aspect of the embodiments of the present application, a cell reselection evaluation frequency determination apparatus is provided. The apparatus includes a preprocessing module, an initial frequency module, and a frequency update module. The preprocessing module is configured to receive the priority attribute information and determine the duration of the priority attribute information. The priority attribute information includes dedicated priority information and/or priority reduction information. The initial frequency module is configured to determine the cell reselection evaluation frequency set according to the priority attribute information. The frequency update module is configured to update the cell reselection evaluation frequency set when it is determined that the duration corresponding to the priority attribute information is reached.

In another aspect of the embodiments of the present application, an electronic device is provided. The electronic device includes one or more processors and a memory configured to store one or more programs. When executing the one or more programs, the one or more processors perform at least one step of the cell reselection evaluation frequency determination method according to the embodiments of the present application.

In another aspect of the embodiments of the present application, a computer-readable storage medium is provided. The storage medium stores a computer program. When executing the computer program, a processor performs at least one step of the cell reselection evaluation frequency determination method according to the embodiments of the present application.

DETAILED DESCRIPTION

Figure 1:
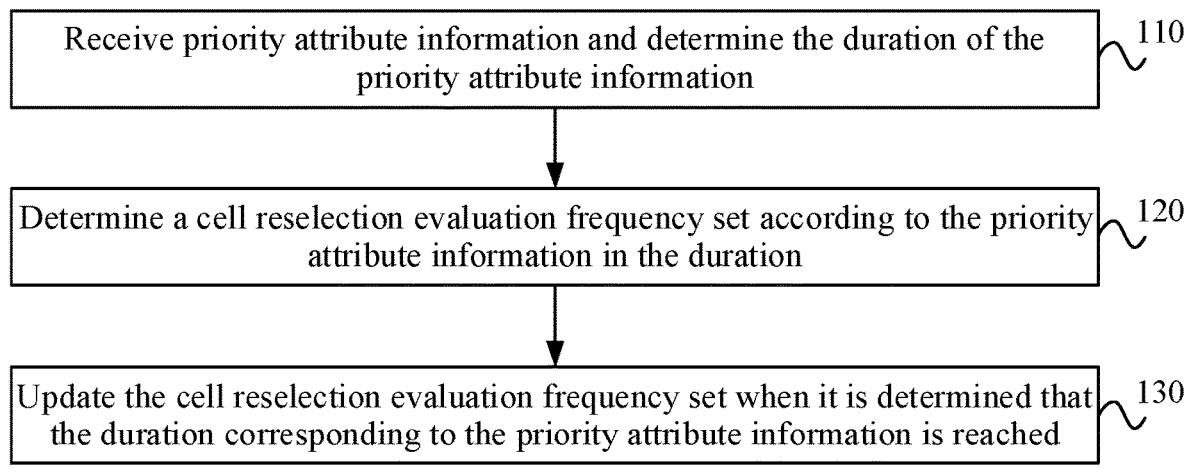
FIG. 1 is a flowchart of a cell reselection evaluation frequency determination method according to an embodiment of the present application.

To illustrate the object, solutions, and advantages of the present application clearer, embodiments of the present application are described hereinafter in detail in conjunction with the drawings. It is to be noted that if not in collision, the embodiments of the present application and features therein may be combined with each other in any manner.

In the related art, UE needs to evaluate a frequency when performing cell reselection. Measurement may be started as long as the evaluated frequency has a priority in the system information, and the evaluated frequency is involved in the evaluation. When the UE has dedicated priority information, a frequency in a reduced priority state. In the related art, only whether such frequency exists in the system information is considered, and if so, the frequency is considered to have the lowest priority to be involved in the reselection. It is not considered whether these frequencies having the lowest priority are in the dedicated priority information when the dedicated priority information is valid. For a frequency in degraded priority information but not in the dedicated priority information, the UE spends a lot of time evaluating the frequency, but may not be able to acquire a service at last. In addition, in the related art, when a dedicated priority is valid, reselection evaluation is only performed on the frequency in the dedicated priority. When reduction priority information is invalid, the frequency not in the dedicated priority information cannot be involved in the cell reselection after the priority is recovered. As a result, the frequency can be involved in the cell reselection when the priority is reduced, but cannot be involved in the cell reselection after the priority is recovered. For example, currently residence frequency is F1, and frequency F2 and frequency F3 are included in the dedicated priority information. When timing device T320 times out, the dedicated priority information is deleted, and the priority in the system information is started for cell reselection evaluation. T320 may be a timer that monitors the dedicated priority information. The priority reduction information stored by the UE includes frequency F1. Timer T325 is started to monitor the duration of the priority reduction information. If T325 corresponding to frequency F4 stored in the UE is still in operation, the UE starts measurement and reselection evaluation on F1 and F4 according to the lowest priority during the operation duration of T325, that is, the cell reselection evaluation frequencies of the UE are F1, F2, F3, and F4. At this time, frequency F4 is an undesired frequency at a network side, and the UE may not be able to obtain a service on frequency F4. At the same time, the measurement and reselection of such frequency measurement also increase the power consumption of the UE. When T325 times out, and T320 is still in operation, the priority reduction information is invalid, and at this time, the cell reselection evaluation frequencies of the UE become F1, F2, and F3. In this case, a problem arises that when the undesired frequency F4 at the network side is degraded, frequency F4 can still be involved in the measurement and reselection evaluation, but after recovered from the degrading, frequency F4 cannot be involved in the reselection. Similarly, the frequency in the system information may be without priority information. If a degraded frequency is exactly a frequency without a priority, after evaluation is started, if reduction priority information is invalid, when the priority is recovered, it may also occur that the frequency can be involved in the reselection evaluation after degraded, but the frequency cannot be involved in the reselection evaluation after the priority is recovered.

That is, the related art only considers whether a frequency is in the system information or not, but does not consider whether the frequency exists in the dedicated priority information. For a frequency in a reduced priority state but not in the dedicated priority information, the UE not only spends a lot of time on frequency measurement and cell reselection evaluation, but may not be able to acquire a service. In addition, when the priority reduction information is invalid, those frequencies that are not included in the dedicated priority information cannot be normally involved in the reselection evaluation of the current cell after the priority is recovered.

FIG. 1 is a flowchart of a cell reselection evaluation frequency determination method according to an embodiment of the present application. This embodiment of the present application may be applied to the case where a frequency is selected during cell reselection evaluation. The method may be executed by a cell reselection evaluation frequency set determination apparatus. The apparatus may be performed by software and/or hardware and may be generally integrated in UE. Referring to FIG. 1, the cell reselection evaluation frequency determination method includes the following.

In 110, priority attribute information is received, and the duration of the priority attribute information is determined. The priority attribute information includes dedicated priority information and/or priority reduction information.

The priority attribute information may be information used for adjusting a frequency priority, for example, a control instruction for upgrading or reducing a certain frequency. The priority attribute information may specifically include dedicated priority information and priority reduction information according to a manner of changing a frequency attribute. The dedicated priority information may be information for adjusting the dedicated priority of a frequency. The dedicated priority information may be from a signaling or inherited by other radio access technology (RAT). The priority reduction information may be information for controlling the reduction of the priority of a frequency. The priority reduction information may include the type of a reduced priority and the duration of priority reduction. The duration may be the length of time for which the priority attribute information has an effect, for example, the duration of the reduced priority of a frequency. The duration may be stored in the priority attribute information.

Specifically, the UE may receive the priority attribute information sent by a base station. The priority attribute information may be used for adjusting the priority of a frequency, for example, reducing the priority of the frequency or changing the priority type of the frequency. The corresponding duration may be extracted from the priority attribute information. It is to be understood that the priority attribute information may include priority adjustment information of one or more frequencies, and that different frequencies may correspond to different duration.

In 120, a cell reselection evaluation frequency set is determined according to the priority attribute information in the duration.

The cell reselection evaluation frequency set may be a frequency set for evaluation when cell reselection is performed. The cell reselection evaluation frequency set may include one or more frequencies. Cell reselection is performed based on a frequency having a dedicated priority in the art.

In this embodiment of the present application, when the UE is in the duration corresponding to the priority attribute information, the UE needs to adjust the priority of a frequency during cell reselection according to the priority attribute information and use the adjusted priority to select a frequency to form a message reselection evaluation frequency set. For example, when the priority attribute information is the priority reduction information, the frequency configuration in the priority reduction information may be used as the lowest priority. When it is determined that the frequency has a dedicated priority, the frequency and the corresponding lowest priority may be added to the cell reselection evaluation frequency set.

In 130, the cell reselection evaluation frequency set is updated when it is determined that the duration corresponding to the priority attribute information is reached.

The duration may be the time range in which the priority attribute information has an effect. When time exceeds the corresponding duration, the priority corresponding to the frequency in the priority attribute information needs to be adjusted again. For example, the duration corresponding to frequency A in the priority reduction information is a. When time is not in the range of time a, the priority of frequency A needs to be recovered from the lowest priority to the original priority. Thus, the frequency in the cell reselection evaluation frequency set needs to be adjusted.

Specifically, the duration of the priority attribute information may be detected. Time may be detected by a timer or a timing device to determine whether the time is in the duration corresponding to the priority attribute information. When the duration corresponding to the priority attribute information is reached, the priority of the frequency in the priority attribute information is adjusted. In this manner, the frequency in the cell reselection evaluation frequency set may no longer have a dedicated priority, or the priority is changed. Frequencies in the cell reselection evaluation frequency set may be increased or decreased, and the priority corresponding to a frequency in the cell reselection evaluation frequency set may be updated.

According to the cell reselection evaluation frequency determination method provided by this embodiment of the present application, the duration of the received priority attribute information is determined, and the cell reselection evaluation frequency set is determined through the priority attribute information in the duration. When the duration corresponding to the priority attribute information is reached, the cell reselection evaluation frequency set is updated. In this manner, the accurate acquisition of a cell reselection evaluation frequency is implemented. Moreover, the frequency selection error caused by a frequency priority change is prevented, and frequency measurement time is reduced. Thus, the power consumption of the UE is reduced.

Figure 2:
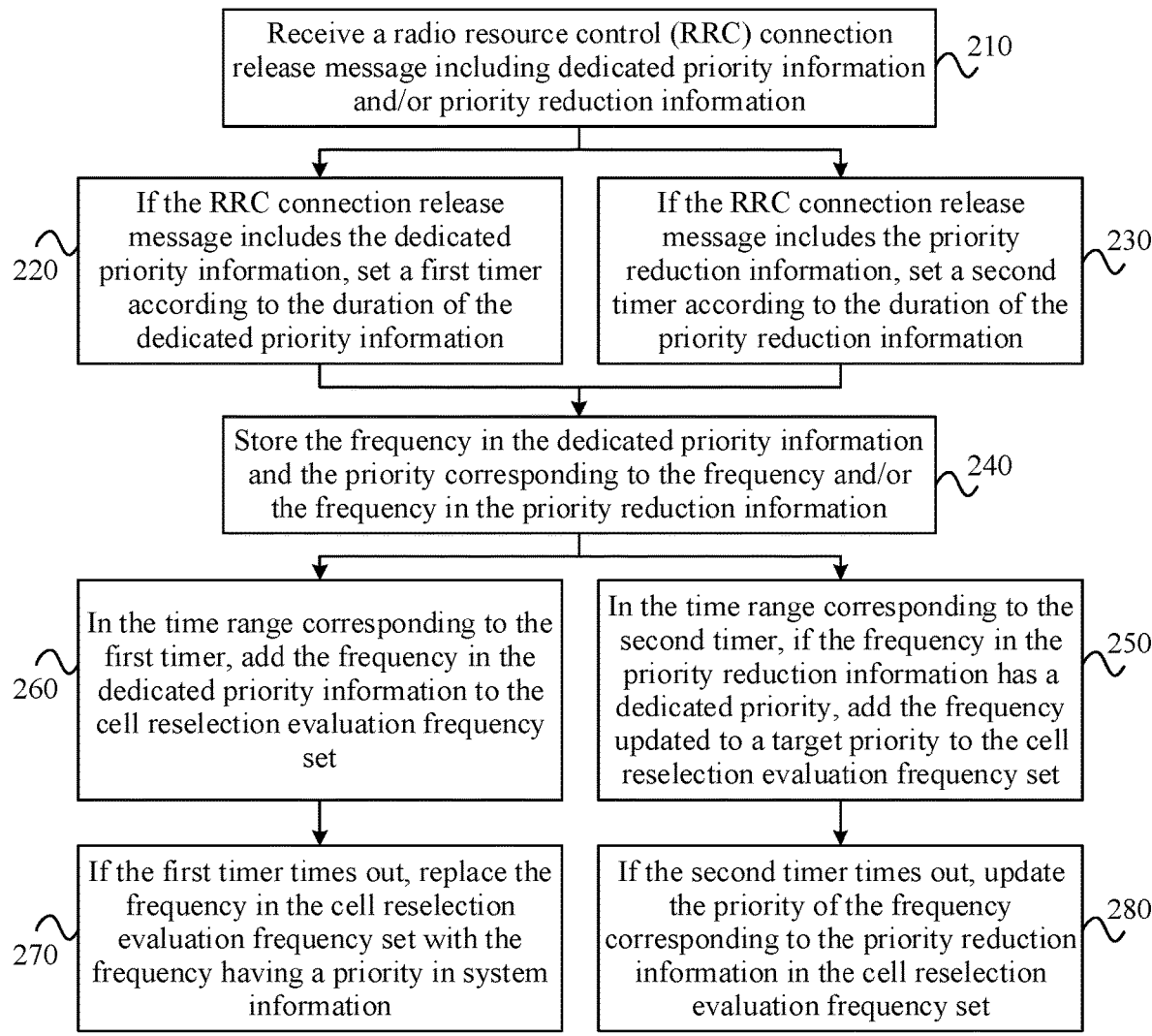
FIG. 2 is another flowchart of the cell reselection evaluation frequency determination method according to an embodiment of the present application.

FIG. 2 is another flowchart of a cell reselection evaluation frequency determination method according to an embodiment of the present application. FIG. 2 is an embodiment based on the cell reselection evaluation frequency determination method shown in FIG. 1 and describes the determination of a cell reselection evaluation frequency through the dedicated priority information and priority reduction information. Referring to FIG. 2, the cell reselection evaluation frequency determination method may include the following.

In 210, an RRC connection release message including dedicated priority information and/or priority reduction information is received.

The RRC connection release message may be information sent by a network to the UE to notify the UE to release an RRC connection and the corresponding radio resource. The RRC connection release message may include one or more of dedicated priority information and priority reduction information.

In this embodiment of the present application, the UE may receive the RRC connection release message. The RRC connection release message may include dedicated priority information and/or priority reduction information. The dedicated priority information may include the type of a reduced priority. For example, the type may include a frequency and a standard. The frequency type indicates that the current carrier frequency is reduced to the lowest priority in cell reselection. The standard type indicates that all frequencies corresponding to the current standard are reduced to the lowest priority in the cell reselection. The dedicated priority information may also include the duration for which a frequency is at the lowest priority through reduction. The dedicated priority information may be information for configuring the dedicated priority of a carrier frequency. The dedicated priority information may include a frequency and the dedicated priority corresponding to the frequency.

In an optional embodiment, the priority reduction information may include at least one of frequency priority reduction information or standard priority reduction information.

Specifically, the frequency priority reduction information may be information for controlling a carrier frequency to be reduced to the lowest priority. The frequency priority reduction information may include reduction information of one or more frequencies. Accordingly, the standard priority reduction information may be information for indicating that all frequencies of new radio (NR) are reduced to the lowest priority.

In 220, if the RRC connection release message includes the dedicated priority information, a first timer is set according to the duration of the dedicated priority information.

The first timer may be an apparatus configured to record time. The first timer may be specifically disposed inside the UE. The first timer is configured to record a duration for which a frequency is configured to be a dedicated priority.

In this embodiment of the present application, when the RRC connection release message includes the dedicated priority information, a time period in which the frequency in the dedicated priority information is configured to be the dedicated priority may be extracted. The time period may be in units of minutes. A timer is disposed in the UE through the acquired time period. The timing time of the timer is set to the acquired time period. It is to be understood that when multiple frequencies are included in the dedicated priority information, a separate first timer may be disposed for each frequency. The time configured for each first timer may be the duration for which the corresponding frequency is at the lowest priority through reduction.

In 230, if the RRC connection release message includes the priority reduction information, a second timer is set according to the duration of the priority reduction information.

The second timer may be an apparatus for recording time. The second timer may be specifically disposed inside the UE. The second timer is configured to record a duration for which a frequency is reduced.

Specifically, when the RRC connection release message includes the priority reduction information, the time period in which the frequency in the priority reduction information is at the lowest priority through reduction may be extracted. The unit of the time period may be a minute. A timer is disposed in the UE, and the time of the timer is set to the extracted time period. In this embodiment of the present application, the priority reduction information may include one or more frequencies that are reduced to the lowest priority. A second timer may be configured for each frequency to store a time period in which each frequency is maintained at the lowest priority.

In 240, the frequency in the dedicated priority information and the priority corresponding to the frequency are stored, and/or the frequency in the priority reduction information is stored.

In this embodiment of the present application, after the UE receives the dedicated priority information, the UE may store the frequency in the dedicated priority information and the priority corresponding to the frequency. After the UE receives the priority reduction information, the UE may store the frequency in the priority reduction information to facilitate the determination of the cell reselection evaluation frequency set in the subsequent process.

In 250, in the time range corresponding to the second timer, if the frequency in the priority reduction information has a dedicated priority, the frequency updated to a target priority is added to the cell reselection evaluation frequency set.

The target priority may be the priority to which the frequency that has a reduced priority is reduced. The target priority may be the lowest of all priorities. The target priority may be determined by the priority reduction information.

Specifically, the time configured by the second timer may be the duration corresponding to the priority reduction information. In the time range corresponding to the second timer, the priority of the frequency in the priority reduction information needs to be reduced. The target priority is acquired from the priority reduction information, or the lowest priority among all the priorities is directly used as the target priority. The target priority and the frequency are added to the cell reselection evaluation frequency set.

In 260, in the time range corresponding to the first timer, the frequency in the dedicated priority information is added to the cell reselection evaluation frequency set.

In this embodiment of the present application, the time configured by the first timer may be duration corresponding to the dedicated priority information. In the time range corresponding to the first timer, the frequency in the dedicated priority information has a dedicated priority. The frequency in the dedicated priority information may be added to the cell reselection evaluation frequency set. In an optional embodiment, it is to be understood that when the frequency having the dedicated priority is added to the cell reselection evaluation frequency set, it may be determined that the frequency is found in the priority reduction information. The current time is in the time range of the second timer, and the priority of the frequency may be reduced, and the reduced priority and the frequency may be added to the cell reselection evaluation frequency set.

In 270, if the first timer times out, a frequency in the cell reselection evaluation frequency set is replaced by a frequency having a priority in the system information.

The system information may include information for assigning a priority to a frequency. The priority or a frequency and the corresponding priority may be given in the system information. In this embodiment of the present application, when the frequency and the corresponding priority are given in the system information, the frequency may be used for cell reselection evaluation.

Specifically, the first timer times out, and the corresponding dedicated priority information becomes invalid. The frequency in the dedicated priority information no longer has a dedicated priority. At this time, the frequency whose dedicated priority is invalid in the cell reselection evaluation frequency set is no longer applied to cell reselection. A frequency having a priority may be selected in the system information. The priority of the frequency in the system information may be used and updated into the cell reselection evaluation frequency set. When the cell reselection evaluation frequency set is updated, if the frequency in the system information already exists in the cell reselection evaluation frequency set, the priority associated with the frequency in the cell reselection evaluation frequency set is replaced with the priority corresponding to the system information. If the frequency in the system information is not stored in the cell reselection evaluation frequency set, the frequency and the priority of the frequency in the system information are added to the cell reselection evaluation frequency set.

In an optional embodiment, the frequency in the cell reselection evaluation frequency set may be replaced with the frequency having the priority in the system information in the following manner: In response to the time range corresponding to the second timer of the frequency, the frequency in the cell reselection evaluation frequency set is replaced with the frequency reduced to the target priority.

In this embodiment of the present application, when the first timer times out, and the frequency in the cell reselection evaluation frequency set is replaced with the frequency having the priority in the system information, the second timer of the frequency is determined. If the second timer of the frequency is in the corresponding time range, that is, the second timer of the frequency is valid, the frequency needs to be reduced to the target priority. For this reason, the frequency is set as the target priority. The frequency exists in the cell reselection evaluation frequency set, and the corresponding priority is replaced by the target priority. The frequency does not exist in the cell reselection evaluation frequency set, and the frequency and the target priority are added to the cell reselection evaluation frequency set.

In 280, if the second timer times out, the priority of the frequency corresponding to the priority reduction information in the cell reselection evaluation frequency set is updated.

In this embodiment of the present application, the second timer times out, and the corresponding reduction priority information becomes invalid. The priority of the frequency whose priority is reduced needs to be recovered. The frequency whose priority is reduced in the cell reselection evaluation frequency set may update the corresponding priority. For example, the second timer may correspond to each frequency. When the time of a second timer is in a timeout state, the frequency corresponding to the second timer may be acquired. The priority of the frequency is changed in the cell reselection evaluation frequency set. The priority of the frequency may be determined by a dedicated signaling, system information, or dedicated priority information.

According to the cell reselection evaluation frequency determination method provided by this embodiment of the present application, the RRC connection release message receives one or more of the dedicated priority information and priority reduction information. When the RRC connection release message receives the dedicated priority information, the first timer is set according to the duration of the dedicated priority information. When the RRC connection release message receives the priority reduction information, the second timer is set according to the duration of the priority reduction information. The frequency and the priority in the dedicated priority information and the frequency and the priority in the priority reduction information are stored. In the time corresponding to the first timer, the frequency is added to the cell reselection evaluation frequency set through the dedicated priority information. In the time corresponding to the second timer, the frequency is added to the cell reselection evaluation frequency set through the reduction priority information. When the first timer times out, the frequency in the reduction priority information is deleted from the cell reselection evaluation set. The frequency including the priority is selected from the system information and added to the cell reselection evaluation set. When the second timer times out, the priority of the frequency in the cell reselection evaluation frequency set is updated based on the reduction priority information. In this manner, the accurate acquisition of a cell reselection evaluation frequency is implemented, and priority changes that cause the cell reselection evaluation frequency to be invalid are reduced. Thus, frequency measurement time is reduced, and the power consumption of the UE can be saved.

In an optional embodiment, the priority of the frequency corresponding to the priority reduction information in the cell reselection evaluation frequency set is updated in the following manners: A target frequency is determined according to the type of the priority reduction information; a recovery priority corresponding to the target frequency is determined, where the recovery priority includes a dedicated priority and/or a system information priority; and the priority of the target frequency in the cell reselection evaluation frequency set is replaced by the recovery priority.

The target frequency may be the frequency of the updated priority in the cell reselection evaluation frequency set and may be determined by the priority reduction information. The recovery priority may be a priority to which the target frequency is recovered. The recovery priority may be acquired from system information, dedicated priority information, and other RAT inheritance. The recovery priority may include a dedicated priority and/or a system information priority. When a frequency has a dedicated priority, and the priority reduction information of the frequency is invalid, the recovery priority of the frequency may acquire priority information from the dedicated priority information and be used as a dedicated priority. When a frequency has a system information priority, the recovery priority of the frequency may be acquired from the system information or other RAT inheritance.

Specifically, after the target frequency corresponding to the invalid priority reduction information and the recovery priority corresponding to the target frequency are acquired, the priority of the target frequency in the cell reselection evaluation frequency set may be replaced by the acquired recovery priority.

In an optional embodiment, the target frequency may be determined according to the type of the priority reduction information in the following manners: If the priority reduction information is frequency priority reduction information, the frequency in the priority reduction information is used as the target frequency; and if the priority reduction information is standard priority reduction information, the standard corresponding to the standard priority reduction information is determined, and all the frequencies corresponding to the standard in the cell reselection evaluation frequency set is used as the target frequency.

In this embodiment of the present application, the priority reduction information may include frequency priority reduction information and standard priority reduction information according to types. The frequency priority reduction information may be information for controlling a carrier frequency to be reduced to the lowest priority. The frequency priority reduction information may include reduction information of one or more frequencies. Accordingly, the standard priority reduction information may be information for indicating that all frequencies of NR are reduced to the lowest priority. When the priority reduction information is the frequency priority reduction information, the target frequency may be a frequency specified in the frequency priority reduction information. When the priority reduction information is the standard priority reduction information, the target frequency may be one or more frequencies corresponding to a standard specified in the standard priority reduction information.

In an exemplary embodiment, the user equipment (UE) receives the RRC connection release message. If the RRC connection release message carries the dedicated priority information and priority reduction information, the UE performs storage processing. For the priority reduction information, if the degrading type carried in the priority reduction information is a frequency, and if the current frequency is stored locally in the UE, the timer T325 of the frequency is restarted according to the currently carried duration; otherwise the current frequency is stored, and the timer T325 of the frequency is started through the duration of the current frequency. If the carried degrading type is an NR standard, the priority reduction information is recorded as a standard, and the timer T325 is started. If degraded standard information already exists locally, the timer T325 is restarted according to the current timing duration. The priority and frequency carried in the RRC connection release message are stored. If there is dedicated priority information, timer T320 is started. The corresponding dedicated priority during the operation of the timer T320 is valid. The duration of the timer T320 may be determined by the dedicated priority information. If the dedicated priority information carries duration, the timer T320 is set to the duration. If the dedicated priority does not carry duration, it is considered that the duration of T320 is infinite.

The frequency used for cell reselection may be selected through the storage information in the UE. During the operation of the timer T320, there is a frequency having a dedicated priority. If the frequency is in the priority reduction information, the priority of the frequency is reduced to the lowest priority. The dedicated priority information of the frequency is ignored, and the frequency is added to the cell reselection evaluation frequency set. For the frequency not in the priority reduction information, the priority in the dedicated priority information may be used to be added to the cell reselection evaluation frequency set. For the frequency in the priority reduction information but not in the dedicated priority information, the UE does not add the frequency to the cell reselection evaluation frequency set, that is, for the frequency having a reduced priority that is not involved in cell reselection, only the monitoring of the timer T325 is started, but the frequency having a reduced priority that is not involved in cell reselection is not used as an alternative frequency in the cell reselection evaluation frequency set.

In an exemplary embodiment, when a timer times out, if the timer T320 corresponding to the dedicated priority information times out, the dedicated priority information is deleted in the UE. At this time, the cell reselection evaluation frequency set needs to be updated again. The UE selects a frequency having priority information from the system information. If the frequency is in the priority reduction information, the frequency is given the lowest priority and put into the cell reselection evaluation frequency set. If the frequency is not in the priority reduction information, the frequency is stored to the cell reselection evaluation frequency set according to the priority information carried in the system information. For the frequency having no priority in the system information, the frequency is not added to the cell reselection evaluation frequency set, even if the frequency is in the priority reduction information and is given the lowest priority. That is, if the frequency in the priority reduction information does not have valid priority information in the system information, the frequency cannot be involved in cell reselection.

In another exemplary embodiment, when a timer times out, if the timer T325 corresponding to the priority reduction information times out, the priority reduction information stored in the UE is deleted, and the cell reselection evaluation frequency set is updated. Specifically, for the frequency whose priority is recovered, if the frequency is in valid dedicated priority information, the priority corresponding to the frequency is recovered from the lowest priority to the priority corresponding to the dedicated priority information. If the frequency is not in the dedicated priority information, the priority of the frequency may be selected in the system information. If the deleted priority reduction information is used to reduce the NR standard, the priorities of all frequencies in the cell reselection evaluation frequency set are updated. Update is performed according to the priority of each frequency in the dedicated priority information or system information. In an optional embodiment, if the frequency of a recovery priority is not in the cell reselection evaluation frequency set, the UE deletes only the corresponding reduction priority information without other processing.

Figure 3:
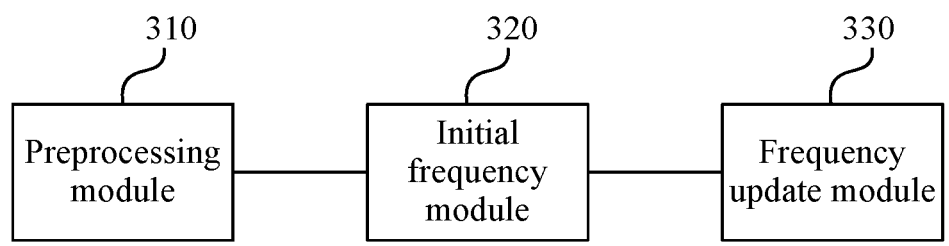
FIG. 3 is a diagram illustrating the structure of a cell reselection evaluation frequency determination apparatus according to an embodiment of the present application.

FIG. 3 is a diagram illustrating the structure of a cell reselection evaluation frequency determination apparatus according to an embodiment of the present application. The apparatus shown in FIG. 3 may execute any step of the cell reselection evaluation frequency determination method provided by this embodiment of the present application and has functional modules and beneficial effects corresponding to the method executed. The apparatus may be performed by software and/or hardware and may be generally integrated in the UE. The cell reselection evaluation frequency determination apparatus includes a preprocessing module 310, an initial frequency module 320, and a frequency update module 330.

The preprocessing module 310 is configured to receive the priority attribute information and determine the duration of the priority attribute information. The priority attribute information includes dedicated priority information and/or priority reduction information.

The initial frequency module 320 is configured to determine the cell reselection evaluation frequency set according to the priority attribute information in the duration.

The frequency update module 330 is configured to update the cell reselection evaluation frequency set when it is determined that the duration corresponding to the priority attribute information is reached.

According to the cell reselection evaluation frequency determination apparatus provided by this embodiment of the present application, the duration of the received priority attribute information is determined by the preprocessing module 310. The initial frequency module 320 determines the cell reselection evaluation frequency set through the priority attribute information in the duration. The frequency update module 330 updates the cell reselection evaluation frequency set when the duration corresponding to the priority attribute information is reached. In this manner, the accurate acquisition of a cell reselection evaluation frequency is implemented. Moreover, the frequency selection error caused by a frequency priority change is prevented, and frequency measurement time is reduced. Thus, the power consumption of the UE is reduced.

In an optional embodiment, the preprocessing module 310 may include a message receiving unit, a first timing unit, and a second timing unit.

The message receiving unit is configured to receive the RRC connection release message including dedicated priority information and/or priority reduction information.

The first timing unit is configured to, if the RRC connection release message includes the dedicated priority information, set the first timer according to the duration of the dedicated priority information.

The second timing unit is configured to, if the RRC connection release message includes the priority reduction information, set the second timer according to the duration of the priority reduction information.

In an optional embodiment, the cell reselection evaluation frequency determination apparatus may also include an information storage module configured to store the frequency in the dedicated priority information and the priority corresponding to the frequency and/or the frequency in the priority reduction information.

In an optional embodiment, the priority reduction information in the apparatus includes at least one of frequency priority reduction information or standard priority reduction information.

In an optional embodiment, the initial frequency module 320 may include a first initial unit configured to, in the time range corresponding to the first timer, add the frequency in the dedicated priority information to the cell reselection evaluation frequency set.

In an optional embodiment, the initial frequency module 320 may also include a second initial unit configured to, in the time range corresponding to the second timer, if the frequency in the priority reduction information has a dedicated priority, add the frequency updated to the target priority to the cell reselection evaluation frequency set.

In an optional embodiment, the frequency update module 330 may include a dedicated timeout unit configured to, if the first timer times out, replace the frequency in the cell reselection evaluation frequency set with the frequency having a priority in the system information.

In an optional embodiment, the dedicated timeout unit may include a priority reduction subunit configured to, in response to the time range corresponding to the second timer of the frequency, replace the frequency reduced to the target priority into the cell reselection evaluation frequency set.

In an optional embodiment, the frequency update module 330 may also include a reduction timeout unit configured to, if the second timer times out, update the priority of the frequency corresponding to the priority reduction information in the cell reselection evaluation frequency set.

In an optional embodiment, the reduction timeout unit may include a target subunit, a recovery subunit, and an update subunit. The target subunit is configured to determine the target frequency according to the type of the priority reduction information. The recovery subunit is configured to determine the recovery priority corresponding to the target frequency. The recovery priority includes a dedicated priority and/or a system information priority. The update subunit is configured to replace the priority of the target frequency in the cell reselection evaluation frequency set with the recovery priority.

In an optional embodiment, the target subunit may be specifically configured to: if the priority reduction information is the frequency priority reduction information, use the frequency in the priority reduction information as the target frequency; and if the priority reduction information is the standard priority reduction information, determine the standard corresponding to the standard priority reduction information and use all a frequency corresponding to the standard in the cell reselection evaluation frequency set as the target frequency.

Figure 4:
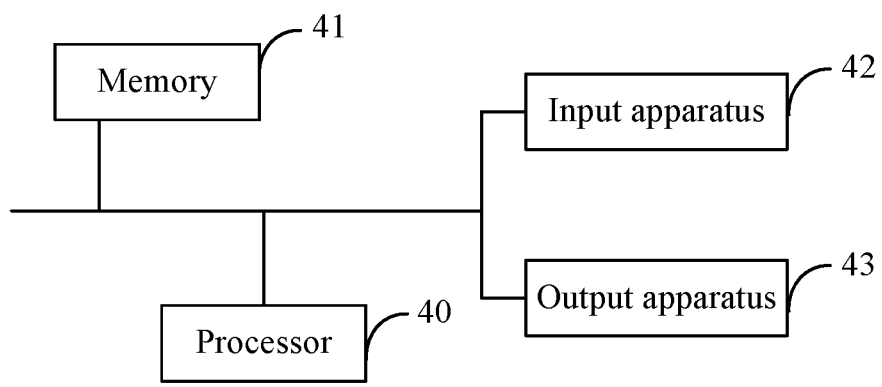
FIG. 4 is a diagram illustrating the structure of an electronic device according to an embodiment of the present application.

FIG. 4 is a diagram illustrating the structure of an electronic device according to an embodiment of the present application. As shown in FIG. 4, the electronic device includes a processor 40, a memory 41, an input apparatus 42, and an output apparatus 43. One or more processors 40 may be disposed in the electronic device, and one processor 40 is used as an example in FIG. 4. The processor 40, the memory 41, the input apparatus 42, and the output apparatus 43 may be connected by a bus or other modes. Connecting by a bus is used as an example in FIG. 4.

As a computer-readable storage medium, the memory 41 may be configured to store software programs and computer-executable software programs and modules, such as corresponding modules (the preprocessing module 310, the initial frequency module 320, and the frequency update module 330) in the cell reselection evaluation frequency determination apparatus in this embodiment of the present application. The processor 40 runs the software programs, instructions, and modules stored in the memory 41 to perform function applications and data processing of the electronic device, that is, the preceding cell reselection evaluation frequency determination method is implemented.

The memory 41 may mainly include a program storage region and a data storage region. The program storage region may store an operating system and an application program required by at least one function. The data storage region may store data created according to use of the electronic device. In addition, the memory 41 may include a high-speed random-access memory and may also include a non-volatile memory, such as at least one disk memory, a flash memory, or other non-volatile solid-state memories. In some examples, the memory 41 may also include memories located remotely relative to the processor 40, and these remote memories may be connected to the electronic device via a network. Examples of the preceding network include, but are not limited to, the Internet, an intranet, a local area network, a mobile communication network, and a combination thereof.

The input apparatus 42 may be configured to receive inputted digital or character information and generate key signal input related to user settings and function control of the electronic device. The output apparatus 43 may include display devices such as a display screen.

An embodiment of the present application provides a computer-readable storage medium. The storage medium stores computer-executable instructions. When executing the computer-executable instructions, a computer processor is configured to execute a cell reselection evaluation frequency determination method. The method includes receiving priority attribute information and determining the duration of the priority attribute information, where the priority attribute information includes dedicated priority information and/or priority reduction information; determining a cell reselection evaluation frequency set according to the priority attribute information in the duration; and updating the cell reselection evaluation frequency set when it is determined that the duration corresponding to the priority attribute information is reached.

Of course, in the computer-readable storage medium including computer-executable instructions provided by this embodiment of the present application, the computer-executable instructions may execute not only the preceding method operations but also related operations in a function remote customization method provided by this embodiment of the present application.

The preceding are only example embodiments of the present application and not intended to limit the scope of the present application.

It is to be understood by those skilled in the art that the term "UE" covers any suitable type of radio UE, for example, a mobile phone, a portable data processing device, a portable web browser, or a vehicle-mounted mobile station.

In general, embodiments of the present application may be implemented in hardware or special-purpose circuits, software, logics, or any combination thereof. For example, some aspects may be implemented in hardware while other aspects may be implemented in firmware or software executable by a controller, a microprocessor, or another computing apparatus, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in the drawings of the present application may represent program steps, or may represent interconnected logic circuits, modules, and functions, or may represent a combination of program steps and logic circuits, modules, and functions. Computer programs may be stored in a memory. The memory may be of any type suitable for the local technical environment and may be implemented using any suitable data storage technology, such as, but not limited to, a read-only memory (ROM), a random-access memory (RAM), and an optical memory device and system (a digital versatile disc (DVD), or a compact disc (CD)). A computer-readable medium may include a non-transitory storage medium. Data processors may be of any type suitable for the local technical environment and may be, for example, but not limited to, a general-purpose computer, a special-purpose computer, a microprocessor, a digital signal processor (DSP), an application-specific integrated circuit (ASIC), a field programmable gate array (FPGA), and a processor based on multi-core processor architecture.

The detailed description of example embodiments of the present application has been provided above through exemplary and non-restrictive examples. However, considering the drawings and the claims, various modifications and adjustments to the preceding embodiments are apparent to those skilled in the art without deviating from the scope of the present application. Accordingly, the proper scope of the present application is determined according to the claims.

What is claimed is:

1. A cell reselection evaluation frequency determination method, comprising:
   receiving priority attribute information and determining duration of the priority attribute information, wherein the priority attribute information comprises at least one of dedicated priority information or priority reduction information;
   determining, in the duration, a cell reselection evaluation frequency set according to the priority attribute information; and
   updating the cell reselection evaluation frequency set in response to determining the duration corresponding to the priority attribute information is reached;
   wherein receiving the priority attribute information and determining the duration of the priority attribute information comprise:
     receiving a radio resource control (RRC) connection release message comprising at least one of the dedicated priority information or the priority reduction information;
     in response to the RRC connection release message comprising the dedicated priority information, setting a first timer according to duration of the dedicated priority information; and
     in response to the RRC connection release message comprising the priority reduction information, setting a second timer according to duration of the priority reduction information;
   wherein updating the cell reselection evaluation frequency set in response to determining the duration corresponding to the priority attribute information is reached comprises:
     in response to a timeout of the second timer, updating a priority of a frequency corresponding to the priority reduction information in the cell reselection evaluation frequency set; and
   wherein updating the priority of the frequency corresponding to the priority reduction information in the cell reselection evaluation frequency set comprises:
     determining a target frequency according to a type of the priority reduction information;

determining a recovery priority corresponding to the target frequency, wherein the recovery priority comprises at least one of a dedicated priority or a system information priority; and replacing a priority of the target frequency in the cell reselection evaluation frequency set with the recovery priority.

2. The cell reselection evaluation frequency determination method according to claim 1, further comprising at least one of the following:

storing a frequency in the dedicated priority information and a priority corresponding to the frequency; or storing a frequency in the priority reduction information.

3. The cell reselection evaluation frequency determination method according to claim 2, wherein updating the cell reselection evaluation frequency set in response to determining the duration corresponding to the priority attribute information is reached comprises:

in response to a timeout of the first timer, replacing a frequency in the cell reselection evaluation frequency set with a frequency having a priority in system information.

4. The cell reselection evaluation frequency determination method according to claim 2, wherein updating the cell reselection evaluation frequency set in response to determining the duration corresponding to the priority attribute information is reached comprises:

in response to a timeout of the second timer, updating a priority of a frequency corresponding to the priority reduction information in the cell reselection evaluation frequency set.

5. The cell reselection evaluation frequency determination method according to claim 1, wherein the priority reduction information comprises at least one of frequency priority reduction information or standard priority reduction information.

6. The cell reselection evaluation frequency determination method according to claim 5, wherein updating the cell reselection evaluation frequency set in response to determining the duration corresponding to the priority attribute information is reached comprises:

in response to a timeout of the first timer, replacing a frequency in the cell reselection evaluation frequency set with a frequency having a priority in system information.

7. The cell reselection evaluation frequency determination method according to claim 5, wherein updating the cell reselection evaluation frequency set in response to determining the duration corresponding to the priority attribute information is reached comprises:

in response to a timeout of the second timer, updating a priority of a frequency corresponding to the priority reduction information in the cell reselection evaluation frequency set.

8. The cell reselection evaluation frequency determination method according to claim 1, wherein determining, in the duration, the cell reselection evaluation frequency set according to the priority attribute information comprises:

in response to determining that a dedicated priority exists for a frequency in the priority reduction information in a time range corresponding to the second timer, adding the frequency updated to a target priority to the cell reselection evaluation frequency set.

9. The cell reselection evaluation frequency determination method according to claim 8, wherein updating the cell reselection evaluation frequency set in response to determining the duration corresponding to the priority attribute information is reached comprises:

in response to a timeout of the first timer, replacing a frequency in the cell reselection evaluation frequency set with a frequency having a priority in system information.

10. The cell reselection evaluation frequency determination method according to claim 8, wherein updating the cell reselection evaluation frequency set in response to determining the duration corresponding to the priority attribute information is reached comprises:

in response to a timeout of the second timer, updating a priority of a frequency corresponding to the priority reduction information in the cell reselection evaluation frequency set.

11. The cell reselection evaluation frequency determination method according to claim 1, wherein determining, in the duration, the cell reselection evaluation frequency set according to the priority attribute information comprises:

adding, in a time range corresponding to the first timer, a frequency in the dedicated priority information to the cell reselection evaluation frequency set.

12. The cell reselection evaluation frequency determination method according to claim 11, wherein updating the cell reselection evaluation frequency set in response to determining the duration corresponding to the priority attribute information is reached comprises:

in response to a timeout of the first timer, replacing a frequency in the cell reselection evaluation frequency set with a frequency having a priority in system information.

13. The cell reselection evaluation frequency determination method according to claim 1, wherein updating the cell reselection evaluation frequency set in response to determining the duration corresponding to the priority attribute information is reached comprises:

in response to a timeout of the first timer, replacing a frequency in the cell reselection evaluation frequency set with a frequency having a priority in system information.

14. The cell reselection evaluation frequency determination method according to claim 13, wherein replacing the frequency in the cell reselection evaluation frequency set with the frequency having the priority in the system information comprises:

in response to determining to be in a time range corresponding to the second timer of the frequency, replacing the frequency in the cell reselection evaluation frequency set with the frequency reduced to a target priority.

15. The cell reselection evaluation frequency determination method according to claim 1, wherein determining the target frequency according to the type of the priority reduction information comprises:

in response to the priority reduction information being frequency priority reduction information, using a frequency in the priority reduction information as the target frequency; and in response to the priority reduction information being standard priority reduction information, determining a standard corresponding to the standard priority reduction information and using all frequencies corresponding to the standard in the cell reselection evaluation frequency set as the target frequency.

16. An electronic device, comprising:
one or more processors; and
a memory configured to store one or more programs, wherein when executing the one or more programs, the one or more processors perform the following steps:

receiving priority attribute information and determining duration of the priority attribute information, wherein the priority attribute information comprises at least one of dedicated priority information or priority reduction information;

determining, in the duration, a cell reselection evaluation frequency set according to the priority attribute information; and updating the cell reselection evaluation frequency set in response to determining the duration corresponding to the priority attribute information is reached;

wherein receiving the priority attribute information and determining the duration of the priority attribute information comprise:

receiving a radio resource control (RRC) connection release message comprising at least one of the dedicated priority information or the priority reduction information;

in response to the RRC connection release message comprising the dedicated priority information, setting a first timer according to duration of the dedicated priority information; and in response to the RRC connection release message comprising the priority reduction information, setting a second timer according to duration of the priority reduction information;

wherein updating the cell reselection evaluation frequency set in response to determining the duration corresponding to the priority attribute information is reached comprises:

in response to a timeout of the second timer, updating a priority of a frequency corresponding to the priority reduction information in the cell reselection evaluation frequency set; and wherein updating the priority of the frequency corresponding to the priority reduction information in the cell reselection evaluation frequency set comprises:

determining a target frequency according to a type of the priority reduction information;

determining a recovery priority corresponding to the target frequency, wherein the recovery priority comprises at least one of a dedicated priority or a system information priority, and replacing a priority of the target frequency in the cell reselection evaluation frequency set with the recovery priority.

17. The electronic device according to claim 16, wherein the one or more processors further perform the following steps:

storing a frequency in the dedicated priority information and a priority corresponding to the frequency; or storing a frequency in the priority reduction information.

18. The electronic device according to claim 16, wherein the priority reduction information comprises at least one of frequency priority reduction information or standard priority reduction information.

19. A non-transitory computer-readable storage medium storing a computer program, wherein when executing the computer program, a processor performs the following steps:

receiving priority attribute information and determining duration of the priority attribute information, wherein the priority attribute information comprises at least one of dedicated priority information or priority reduction information;

determining, in the duration, a cell reselection evaluation frequency set according to the priority attribute information; and updating the cell reselection evaluation frequency set in response to determining the duration corresponding to the priority attribute information is reached;

wherein receiving the priority attribute information and determining the duration of the priority attribute information comprise:

receiving a radio resource control (RRC) connection release message comprising at least one of the dedicated priority information or the priority reduction information;

in response to the RRC connection release message comprising the dedicated priority information, setting a first timer according to duration of the dedicated priority information; and in response to the RRC connection release message comprising the priority reduction information, setting a second timer according to duration of the priority reduction information;

wherein updating the cell reselection evaluation frequency set in response to determining the duration corresponding to the priority attribute information is reached comprises:

in response to a timeout of the second timer, updating a priority of a frequency corresponding to the priority reduction information in the cell reselection evaluation frequency set; and wherein updating the priority of the frequency corresponding to the priority reduction information in the cell reselection evaluation frequency set comprises:

determining a target frequency according to a type of the priority reduction information;

determining a recovery priority corresponding to the target frequency, wherein the recovery priority comprises at least one of a dedicated priority or a system information priority; and replacing a priority of the target frequency in the cell reselection evaluation frequency set with the recovery priority.

20. The non-transitory computer-readable storage medium according to claim 19, wherein the processor further performs the following steps:

storing a frequency in the dedicated priority information and a priority corresponding to the frequency; or storing a frequency in the priority reduction information.

* * * * *